United States Patent [19]

Ciciora

[11] 4,233,628
[45] Nov. 11, 1980

[54] NTSC RECEIVER USEABLE WITH TELETEXT/VIEWDATA INFORMATION

[75] Inventor: Walter S. Ciciora, Park Ridge, Ill.

[73] Assignee: Zenith Radio Corporation, Glenview, Ill.

[21] Appl. No.: 2,523

[22] Filed: Jan. 11, 1979

[51] Int. Cl.³ .................. H04N 7/08; H04N 3/22
[52] U.S. Cl. ................... 358/147; 358/180; 358/142; 358/85; 315/395
[58] Field of Search ........... 358/147.85, 140, 180, 358/142, 146; 315/395; 340/731, 750, 723, 748; 179/2 TV

[56] References Cited

U.S. PATENT DOCUMENTS 4,161,728  7/1979  Insam .................................. 358/85

OTHER PUBLICATIONS

Ciciora et al., "An Introduction to Teletext and Viewdata with Comments on Compatability", *IEEE Transaction on Consumer Electronics*, vol. CE-25, No. 3, Jul. 1979, pp. 235-245.

Daniels, "Wireless World Teletext Decoder", *Wireless World*, vol. 81, No. 1480, pp. 563-566, Dec. 1975.

Kiver, *Television Simplified*, 17th Edition, 1973, Van Nostrand Reinhold Company, pp. 346-347.

Primary Examiner—John C. Martin
Attorney, Agent, or Firm—Thomas E. Hill

[57] ABSTRACT

A Teletext equipped NTSC television receiver system includes means for compressing the raster in the vertical direction in response to 625-line formatted Teletext signals to display normally overscanned horizontal lines on the television viewing screen. Thus 625-line formatted Teletext material may be used directly with NTSC receivers.

13 Claims, 2 Drawing Figures

NTSC RECEIVER USEABLE WITH TELETEXT/VIEWDATA INFORMATION

BACKGROUND OF THE INVENTION

This invention relates generally to Teletext Communication Systems and specifically to means for utilizing Teletext information formatted for 625 line displays in Teletext-equipped NTSC television receivers.

DESCRIPTION OF THE PRIOR ART

Teletext denominates a new and rapidly growing television communication technique which uses the vertical blanking interval of a television broadcast signal for transmission of text and graphical information. Systems are already operational in England for transmitting pages of formatted text material, in digital form on lines 17, 18, 330 and 331 of their 625 line system. Receivers equipped with appropriate decoders and memories are capable of decoding instructions for any page of the transmitted text information and displaying it on their viewing screens.

The transmitted signal includes character or symbol identification in coded form, but not the information for actually generating the character or symbol display. The character generation means are in the receiver and include a read only memory (ROM) and means for "reading" the memory for character generation in response to a character identification input. For example if the decoded signal calls for character "A", the ROM locations are appropriately addressed to produce the required information to form an "A" at the desired location on the television screen. Thus the receiver includes a random access memory (RAM) for storing the decoded digital line signals and a ROM for actual generation of the character or symbol information. The ROM may be microprocessor controlled for addressing the memory in accordance with the input character identification or conventional logic means may control the addressing.

Despite some limitations, such as the access time for information retrieval, the potential of Teletext Communication is enormous. In the British "ORACLE" system for example, the Teletext information consists of bursts of digital signals on the aforementioned lines. Each line-of-data signal contains 360 bits arranged in 45 Bytes of eight bits each. The first five Bytes are used for synchronizing, control and address purposes while the remaining 40 are used to denote characters. Each character is allocated 8 bits and a page consists of 24 rows of 40 characters.

With two data lines per field four pages of text may be transmitted each second. The pages are grouped into magazines of up to 100 pages each. (Up to eight such magazines may be provided.) A control code and address code are used to select and display desired information with every data line containing a coded magazine number and row address.

A special 4 digit time code enables up to 3,200 different texts for each "page" to be transmitted and selected through a time-division-multiplex approach. The time code is not necessarily related to clock time but is used to greatly expand the magazine pages. For example a page may be selected by its magazine number and page number or by the above numbers and a time code.

Since the information is transmitted serially, it may take a little while for a particular page to be transmitted and the viewer may experience some delay between his request and presentation of the information. To minimize delay popular features may be transmitted frequently. On the other hand, pages of limited interest may be transmitted infrequently. Since the receiver has the facility for storing the desired control and data signals it is feasible to store infrequently transmitted, but desired material at a time when the receiver is not being used (i.e. during the early morning hours) which would then be ready for presentation without delay at a later time.

There are various Teletext-like services in operation in England, Europe, and the United States which supply specialized information to subscribers with properly equipped television receivers. The specialized information includes stock market quotations, instructural programs, newscasts, weather information, directories for various activities, sports results, etc.

In practice a viewer with a Teletext equipped receiver would request, via a keyboard or other suitable selection mechanism, display of a magazine index listing of Teletext information available by page and time code, if used. He would then select the page or pages of material he wished to view on his receiver.

As mentioned the digital data includes synchronizing, control and address information for determining paging and format of the information when displayed on the screen. The receiver includes means selecting and storing the desired digital information, a read only memory for storing the necessary character information; means addressing the read only memory under control of the stored digital information and means controlling the address means for proper synchronization and framing the character information being read out of the character memory. The Teletext information is supplied to the receiver video section for proper display on the viewing screen.

The term Teletext is generally considered to refer to over-the-air transmission of text information during the vertical interval. An obvious alternative method for transmission of such information is to use conventional telephone lines. When this is done it is generally referred to as Viewdata. It will be appreciated that, as far as the present invention is concerned, it matters not whether Teletext or Viewdata information is being received. Regardless of whether information transmission occurs via conventional telephone lines as in Viewdata or during the vertical interval via television video signal as in Teletext, the present invention, since it involves only the display of such information, has equal applicability.

In the British 625 line system a Teletext page format is 40 characters per line with the height of each row of characters being 10 lines and a page consisting of 20-24 rows. A 625 line system (312/313 lines per frame) of course contains more "usable lines" than a 525 line NTSC system. In both systems the unusable lines are accounted for by a combination of overscanning and processing time required for the video display. Teletext information which is coded for the British television system has a format requiring 240 usable lines, which is greater than the number of normally visible lines in an NTSC system.

The United States presently has no standard for Teletext material. There is a great deal of interest in enabling any U.S. Teletext system to use material formatted for the British standards with minimum modification. However, none of the systems presently in use in the United States are capable of using such material.

The major difficulty is, that to retain the definition of the British system, 10 horizontal lines for the characters and the number of rows in the page would result in the upper and lower portions of the text material being off the screen because in the NTSC system there is a maximum of 240/241 usable lines, with some of these being lost due to overscanning which is a necessity for mass produced television receivers. To reformat the British Teletext material for use in an NTSC system of, for example, only 20 rows of 10-line characters would thus require human intervention. If the human element were not needed, it would only be necessary to add British data decoders to derive the proper control signals and would only impose a minor capital expenditure on broadcasters.

One suggested solution is to adopt a United States page format requiring only 9 horizontal lines per character. This would permit use of British Teletext material without reformating. However a substantial loss of character definition would result and consequently it is not an acceptable solution.

One system envisioned by the invention would essentially adopt the page format of the British system, namely 24 rows of 10-line characters, (with 40 characters per scan line) and compress the television raster to display all usable lines on the viewing screen. Thus each frame in a field would have 240/241 lines displayed on the receiver screen. Another system envisioned by the invention would utilize raster-compression only for British formatted Teletext material and would process and display locally produced Teletext material in accordance with whatever standard is ultimately adopted in the United States. This latter system would involve having a separate ROM for British formatted characters, decoding logic to determine when British Teletext material was being received and switch means for automatically selecting the appropriate apparatus in accordance with the output of the decoding logic.

OBJECTS OF THE INVENTION

An object of this invention is to provide a novel and improved television receiver.

A further object of this invention is to provide a novel Teletext equipped television receiver.

SUMMARY OF THE INVENTION

In accordance with the invention a Teletext equipped NTSC television receiver having a normal video display capability of 200 usable horizontal lines per field includes signal synthesis means for converting digital signals received during the vertical retrace interval having a format of approximately 240 horizontal scan lines per field and means for altering the picture tube raster to enable said signal synthesis means to make a video display of said digital signals less without alteration of the signal synthesis means.

DESCRIPTION OF THE PREFERRED EMBODIMENTS

Figure 1:
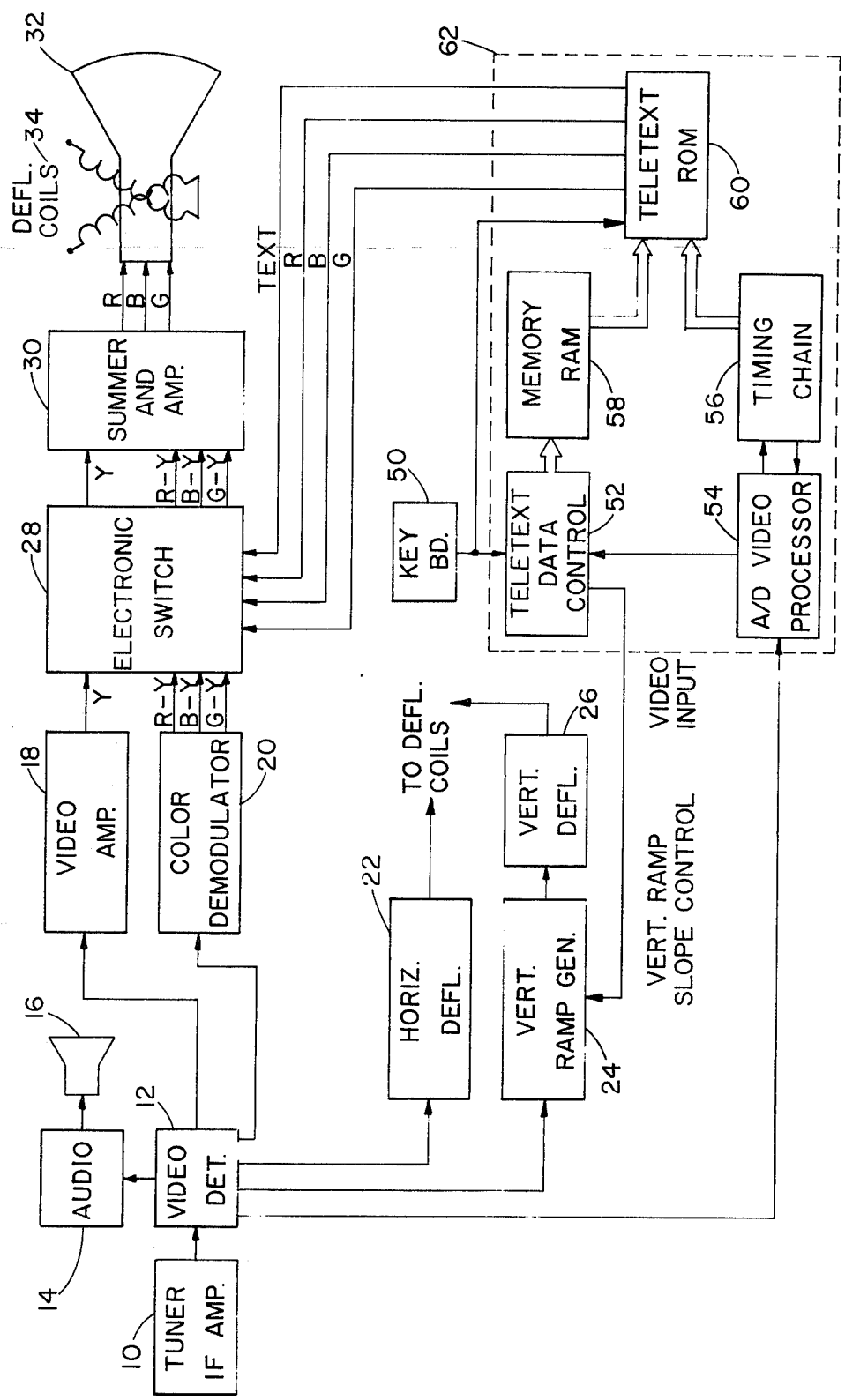
FIG. 1 is a block diagram of a Teletext equipped NTSC television receiver in accordance with one aspect of the invention.

Referring to FIG. 1, a television tuner and IF amplifier 10 is coupled to a video detector 12 which supplies an audio circuit 14, a video amplifier 18, a color demodulator 20, a horizontal deflection circuit 22 and a vertical ramp generator 24. Audio circuit 14 includes conventional detection and amplification circuitry and is coupled to a speaker 16 for reproducing the audio accompaniment of the broadcast television signal. A pair of conventional deflection coils 34 are mounted on the picture tube and are supplied by horizontal deflection circuit 22 and vertical deflection circuit 26. The input of the vertical deflection circuit 26 is supplied from vertical ramp generator 24.

Unlike conventional television receivers, the outputs of color demodulator 20 and the output of video amplifier 18 are supplied to an electronic switch 28. Also, the output of video detector 12 supplies an A/D (analog to digital) video processor 54. The luminance signal Y and color difference signals R-Y, B-Y and G-Y outputs of electronic switch 28 are combined into R, B, and G signals and supplied to a summer and amplifier 30 which feeds appropriate elements in an electron gun structure (not shown) in a picture tube 32. With the exception of the electronic switch, the summer and amplifier and the video output to A/D video processor 54, the color television receiver thus described will be seen to be conventional.

A/D video processor 54 accepts the serial digital Teletext information in the vertical retrace interval of the broadcast television signal and supplies it to a Teletext data control 52 which accesses a memory RAM 58. Memory RAM 58, in turn, accesses a Teletext ROM 60. A/D video processor 54 is intercoupled with a timing chain circuit 56 which also accesses Teletext ROM 60. Teletext data control 52 and Teletext ROM 60 are also accessed by a keyboard 50 by means of which the viewer may select desired pages of Teletext information and system operating modes. In general these modes are Television, Teletext, and Mixed—the latter comprising Teletext information superimposed upon normal television video.

The outputs of ROM 60 include a blanking signal, a so-called text signal and RGB signals, all of which are supplied to electronic switch 28. The RGB signals from the Teletext ROM are of fixed value and the number of colors reproducible is accordingly limited. The text signal is a form of blanking signal and when the receiver is operating in the Teletext mode, blanks out all video except where characters are to appear.

As thus far described the Teletext equipment included in dashed-line box 62 is conventional and the circuit arrangement for utilizing the Teletext equipment in the television receiver is also well-known in the Teletext art. For example see Mullard Technical information Note 54 (Mullard Ltd., Mullard House, Torrington Place, London WC1E7HD) in which the Teletext equipment is described in great detail. The difference in the present circuit is in the lead connecting Teletext data control 52 to vertical ramp generator 24, over which is supplied a vertical ramp slope control signal. When the television receiver is operated in the Teletext mode, the slope of the vertical ramp is changed to affect the vertical deflection circuits in a compressive manner, that is, substantially all of the horizontal lines of each frame are displayed on the television viewing screen of picture tube 32.

As previously mentioned, Teletext information is included during the vertical retrace interval of a standard television broadcast signal and appears on a designated horizontal line in either or both frames. After processing in A/D processor 54, timing control information is supplied to timing chain circuit 56 which derives the essential timing information to enable construction of the selected Teletext display. The information is read into RAM 58 under control of the keyboard and the Teletext data control, and in conjunction with timing chain circuit 56, accesses ROM 60 to synthesize the display of symbols and figures in accordance with the Teletext information selected. ROM 60 comprises all necessary information for complete generation, under control of the memory RAM and timing signals, of the various characters and symbols utilized in the Teletext system. As a gross analogy, the ROM may be thought of as the typewriter and the remainder of the Teletext equipment considered the typist.

For example, if the character A is designated by the memory RAM, the timing signals cause a sequential readout of appropriate memory locations in the ROM. After the requisite number of lines, (10 in the British system), the complete character A will have been formed. The RGB Teletext signals energize the guns in the picture tube via electronic switch 28—so that the appropriate character A of proper color is reproduced. It will be appreciated that the Teletext video information must be synchronized with the deflection system such that the sequentially generated video information has the proper relationship to develop the characters.

In accordance with a first aspect of the invention Teletext data control 52 supplies a vertical ramp slope control signals to vertical ramp 24 to cause the vertical ramp to rise at a slower rate and thus compress the vertical size of the produced display. This compression results in the normally unused (and overscanned) horizontal scan lines being reproduced on the face of the screen and information on these scan lines is therefore visible. It will be noted that the horizontal/vertical aspect ratio of the displayed Teletext information will be affected with the vertical dimension being approximately 10% shorter than normal. However, the benefit of being able to utilize 625-line formatted Teletext information far outweigh this slight degradation in aspect ratio—especially since the vast majority of such information is textual. It is to be noted that in this aspect of the invention Teletext information formatted specifically for NTSC Teletext-equipped receivers would also be subject to raster compression.

Development and implementation of a ramp control signal is readily accomplished. For example, in most television receivers a potentiometer is incorporated in the vertical ramp circuit for adjusting the vertical size of the video display. This potentiometer may easily bridged by a suitable resistor by means of a relay or electronic switch to change the effective resistance in the potentiometer circuit in response to the control signal and result in shrinking the raster on the television screen. The control signal is obtainable from the Teletext circuitry and may conveniently take the form of a simple logic potential. The Teletext circuitry includes a framing code detector which is responsible for determining when Teletext information is received. The output of this detector may be used (with suitable alteration for level changes between the Teletext circuitry and the television receiver) to control functioning of the ramp control relay or electronic switch in the vertical ramp generator. Such an arrangement is believed well within the skill of the art.

Figure 2:
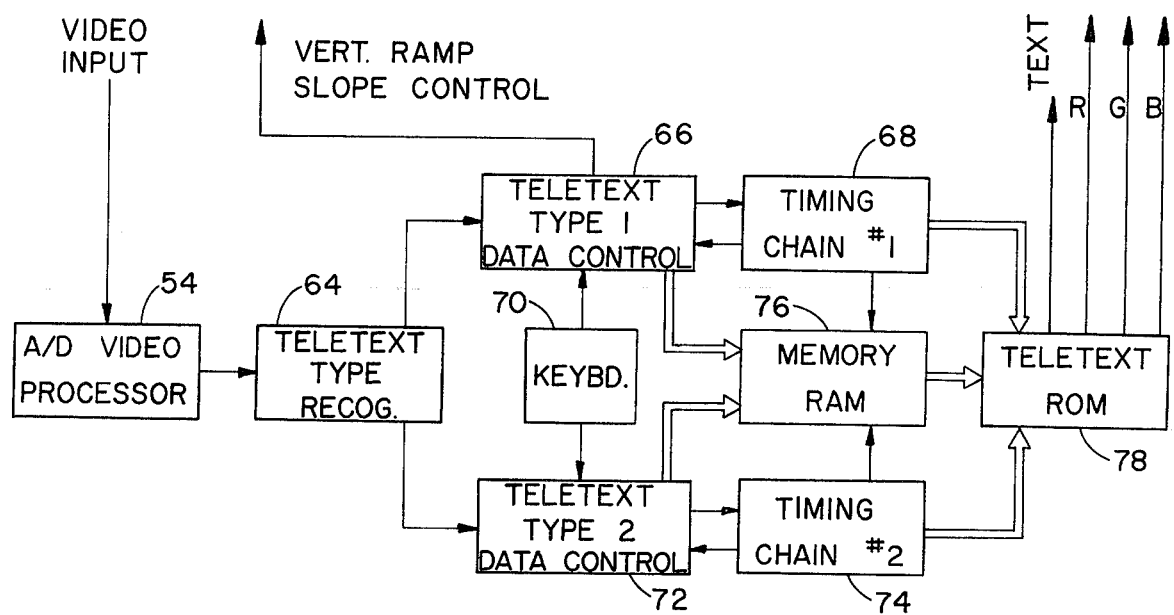
FIG. 2 is a block diagram of a Teletext equipped NTSC television receiver in accordance with another aspect of the invention.

In accordance with a second aspect of the invention, shown in FIG. 2, the system envisions two different types of Teletext material being available for use on an NTSC type television receiver. For those Teletext programs specifically formatted for an NTSC type system no raster change would be required and, consequently, no raster change is involved. However, compatibility with Teletext information formatted for 625-line systems is maintained by using the raster compression approach described for FIG. 1. In its simplest form a common A/D processor, memory RAM and Teletext ROM and separate Teletext data controls and timing chain generators and provided. The keyboard accesses both data controls, each of which is associated with the timing chain generator for its specific Teletext system, directly feeding the common memory RAM. A Teletext type recognition circuit 64 is provided between the A/D processor 54 and Teletext data controls 66 and 76. For NTSC formatted Teletext signals recognition circuit 64 activates data control 66 and timing chain 68 whereas for a 625-line formatted signal the recognition circuit activates data control 72 and its corresponding timing chain 74. The net result is that the character generation ROM is accessible to control by the different timing circuits. Since NTSC formatted Teletext signals would not contain as much information, only part of the ROM is addressed. For example if only 200 lines were used in an NTSC Teletext system the ROM would be accessed only during those 200 lines. In the 625-line formatted signal, however, the ROM would be interrogated for a full 240 lines to display the larger formatted material. (The raster of the television receiver is compressed to enable full display of the 240 lines for 625-line formatted signals.)

The inventive concept uses well known hardware and techniques. Raster expansion is well-known in the art, both in one and two dimensions. See for example U.S. Pat. No. 4,028,726 to Thomas Argy, and assigned to Zenith Radio Corporation. Raster compression would readily be obtainable with an obvious modification to produce a slower vertical ramp. While the horizontal expansion circuit of the Argy Patent may be ignored in the present embodiments, it may be desirable in some cases to compress the entire raster. This may be readily accomplished by supplying a change signal to the horizontal ramp generator from the Teletext data control. This is considered to be an obvious modification and well within the skill of those working in the art. Similarly in the second aspect of the invention the Teletext recognition circuit design, once the specifications are known for the NTSC Teletext system format, should be straightforward. Indeed, and recognition circuit need only be activated when 625-line formatted Teletext information is received—in all other situations the NTSC format being activated. The recognition circuit may simply consist of a tuned circuit which responds to the synchronizing signal in the received Teletext information.

Consequently, anyone skilled in the art and familiar with the inventive concept expressed in these specifications and claims and embodied in the drawings can readily construct a compatible Teletext system. Further, obvious modifications may be made without departing from the scope of the invention as described in the claims.

What is claimed is:

1. An NTSC television receiver capable of normally displaying approximately 200 horizontally lines of video information per field including;

signal synthesis means for generating Teletext video information from coded digital signals received during the vertical intervals of normal television broadcast signals, said Teletext information having a format embracing approximately 240 horizontal scan lines per field; and raster control means for altering the raster of said television receiver to display more than the normal number of horizontal lines and thereby enable direct use of said Teletext information.

2. The television receiver of claim 1 wherein said raster control means constricts the raster of said receiver to display substantially all horizontal lines on the receiver screen.

3. The television receiver of claim 2 wherein there is further included:

switch means operable to selectively place the receiver in a normal video presentation mode and a Teletext presentation mode; and means activating said raster control means when said receiver is in said Teletext presentation mode.

4. The television receiver of claim 3 where said raster is compressed only in the vertical direction.

5. In combination in a television receiver:

signal synthesis means capable of converting first digital signals obtained during the vertical intervals of normal NTSC 525 line television broadcast signals into a Teletext video display, said first digital signals having a format of approximately 200 usable horizontal scan lines per field; and means for making a Teletext display from second digital signals obtained during said vertical intervals, said second digital signals having a vertical format of approximately 240 horizontal scan lines per field, including raster control means for altering the receiver raster to enable display of the video corresponding to said second digital signals without alteration of said signal synthesis means.

6. The combination of claim 5 wherein said raster control means operate to compress the vertical expanse of said raster.

7. The combination of claim 6 wherein said receiver includes a normal video and Teletext video mode; and means for manually selecting the operating mode for said receiver.

8. The combination of claim 7 further including switch means operable when said receivers in said Teletext mode for activating said raster control means in response to said second digital signals.

9. An NTSC television receiver capable of normally displaying approximately 200 horizontal lines of video information per field including:

signal synthesis means for generating video information from coded audio digital signals, said video information having a format embracing approximately 240 horizontal scan lines per field; and raster control means for altering the raster of said television receiver to display more than the normal number of horizontal lines and thereby enable direct use of said video information.

10. The television receiver of claim 9 wherein said coded audio digital signals represent Viewdata video information.

11. The television receiver of claim 9 wherein said raster control means constricts the raster of said receiver to display substantially all horizontal lines on the receiver screen.

12. The television receiver of claim 9 wherein said raster is compressed only in the vertical direction.

13. An NTSC television receiver capable of normally displaying approximately 200 horizontal lines of video information per field including:

signal synthesis means for generating video information from coded digital signals, said video information having a format embracing approximately 240 horizontal scan lines per field; and raster control means for altering the raster of said television receiver to display more than the normal number of horizontal lines and thereby enable direct use of said video information by said television receiver.

* * * * *